C. G. OBERLEY & R. GRIGNON.
FRICTION CLUTCH.
APPLICATION FILED JUNE 18, 1915.
1,173,849.
Patented Feb. 29, 1916.
2 SHEETS—SHEET 1.
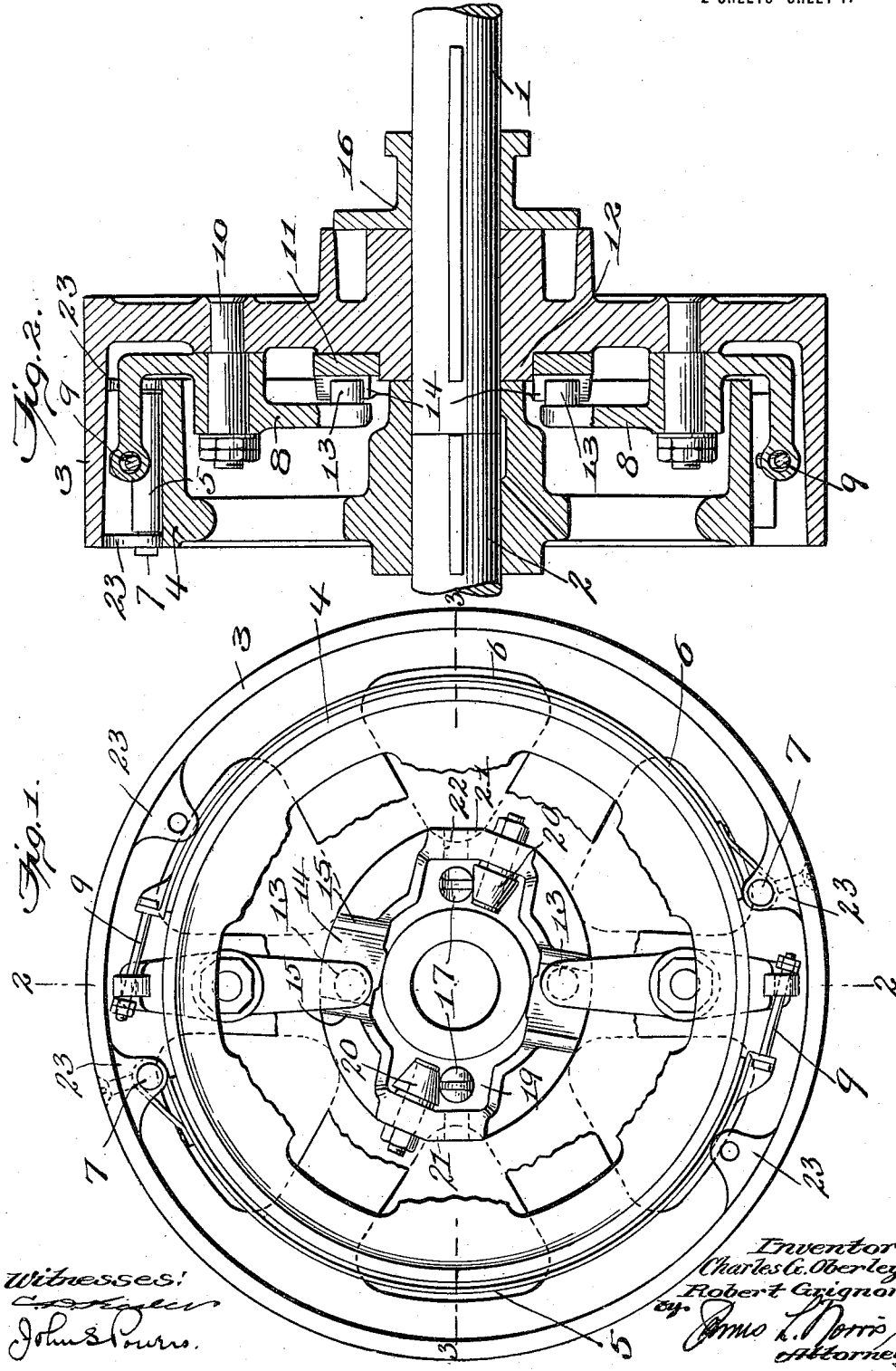

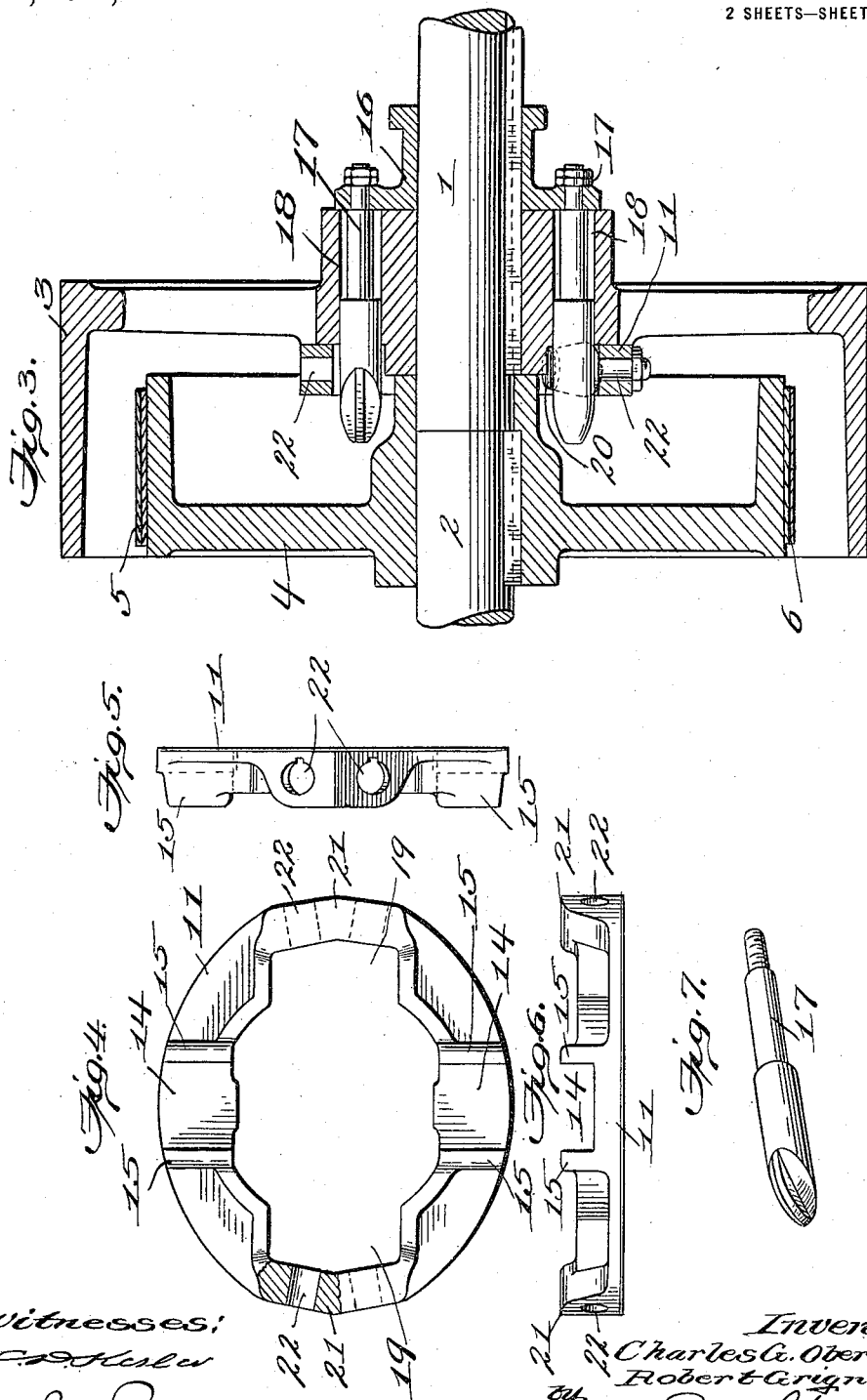

UNITED STATES PATENT OFFICE.

CHARLES G. OBERLEY AND ROBERT GRIGNON, OF SARTELL, MINNESOTA.

FRICTION-CLUTCH.

1,173,849.  Specification of Letters Patent.  Patented Feb. 29, 1916.

Application filed June 18, 1915. Serial No. 34,901.

*To all whom it may concern:*

Be it known that we, CHARLES G. OBERLEY and ROBERT GRIGNON, citizens of the United States, residing at Sartell, in the county of Stearns and State of Minnesota, have invented new and useful Improvements in Friction-Clutches, of which the following is a specification.

This invention relates to improvements in friction clutches of that type wherein two companion concentric drum-like parts and intermediate clutch band means are employed, the function of the clutch band means being to connect the companion parts whereby one is driven from the other, or to disconnect the companion parts whereby the driving part runs free.

The principal objects of the present invention are to provide a simple, efficient and practical construction of the general character stated wherein the elements are specially arranged to avoid side pull on the companion drum members such as would tend to interfere with the alinement of either or both of them, and to provide for the ready reversal of the arrangement of the connecting elements in order that the clutch may be quickly and conveniently adapted to the direction of rotation of the driving shaft.

An embodiment of the invention is illustrated in the accompanying drawings, wherein:—

Figure 1 is an elevation, partly broken away, to show the internally arranged elements of a clutch in which the features of the invention are incorporated; Fig. 2 is a section on the line 2—2 of Fig. 1; Fig. 3 is a section on the line 3—3 of Fig. 1; Figs. 4, 5 and 6 are detail front, side and top elevations of an equalizing element which participates in the operation of the clutch bands; and Fig. 7 is a detail elevation of a pin, of which two are employed in the embodiment disclosed, for operating the equalizing element aforesaid.

Similar characters of reference designate corresponding parts throughout the several views.

In the example disclosed, power is to be transferred from one shaft to another, the two shafts being shown at 1 and 2 in alining relation. The companion drum-like parts above referred to are shown at 3 and 4, the part 3 being keyed or otherwise fast on the shaft 1 and inclosing the part 4 which is fast on the shaft 2.

The clutch band means comprises a pair of similar clutch bands 5 and 6, each having an extent of nearly a half circle and having one end fixed as at 7 to the annular part of the drum 3 adjacent the inner circumferential face thereof and its other end connected by a bolt 9 to an operating lever 8, there being one of said operating levers for each of the clutch bands. The points 7 at which the bands are connected to the drum 3 are located in diametrically opposite relation adjacent the inner circumference of said drum. One of the clutch bands overlies the outer circumferential face of the drum 4 throughout nearly half of its extent, while the other clutch band overlies said circumferential face throughout nearly the remaining half of its extent. The levers 8 by which the clutch bands are operated are pivoted by bolts 10 to the flat wall of the drum 3. The bolts 10 are located along a diameter of said flat wall and between the ends of the levers 8 with which they are associated. By virtue of such arrangement of the levers 8, the movable end of one clutch band adjoins the fixed end of the other clutch band.

The levers 8 are operated by a ring-like element 11 which, for convenience, may be termed a yoke. The yoke 11 is fitted for partial rotation upon an inward hub extension 12 of the drum 3 and is confined against the inner face of the flat wall of the drum 3 by the levers 8, which, at their inner ends, are provided with pins 13 engaging in substantially wider recesses 14 of the yoke 11 provided by spaced lugs 15 formed as parts of said yoke. The pins 13 constantly engage one of the adjacent lugs 15 and the said lugs, which are thus engaged by said pins, are instrumental in operating the levers 8 when the yoke is actuated to produce operations of the levers 8.

A simple and convenient means for operating the yoke 11 comprises a collar 16 slidably mounted on the shaft 1 adjacent the outer face of the flat wall of the drum 3 and provided with pins 17 which project through openings 18 in the hub portion of the drum 3 into and through clearances 19 provided at opposite sides of the yoke 11. Within the clearances 19 projections 20, disposed along an extended diameter of the shaft 1, are arranged, said projections consisting of bolts carried by crown pieces 21 and carrying friction rollers for engagement by the pins 17, the engaging ends of said pins having a suitable cam formation, as shown in Fig. 7.

The operation will be readily apparent from the foregoing description. The drawings assume that the bands 5 and 6 are tightened upon the drum 4 and, hence, connect the drums 3 and 4 so that one will rotate with the other, and in this way, either of the shafts 1 or 2, as the case may be, will be driven from the other. To tighten the bands 5 and 6 upon the drum 4, the collar 16 is moved slidably upon the shaft 1 until it abuts the hub of the drum 3. In such movement of the collar, its pins 17 will be projected within the drum 4, and in the course of their movement they will, engaging the projections 20, rock the yoke 11 about the boss 12 as an axis. Such rocking movement of the yoke 11 is transmitted by the lugs 15 which are engaged by the pins 13 to the levers 8 and said levers are thereby operated to tighten the bands 5 and 6 upon the drum 4. To disconnect the drums 3 and 4 and permit the driving shaft to run free of the driven shaft, the collar 16 is moved slidably along the shaft 1 away from the hub of the drum 3 to a determined position in which the projections 20 are free of the pins 17. When this relation occurs, the bands 5, by virtue of their inherent resiliency, will assume their normal relations wherein they are disengaged from the drum 4 and will reset the levers 8 and the yoke 11.

The construction disclosed in the drawing embodies certain features whereby the clutch may be adapted to either direction of driving motion. As will be apparent from Fig. 1, the parts are shown in the drawings as arranged for counter-clockwise rotation of the driving shaft. They may, however, be readily arranged to adapt the clutch to a driving shaft having clockwise rotation. For the purpose of enabling adaptations of the clutch to either direction of driving motion, the recesses 14 in which the pins 13 of the levers 8 engage are substantially twice the width of said pins; the crown pieces 21 are each provided with two openings 22 in either of which the bolts forming the projections 20 may be arranged; and the drum 3 is provided with two sets of attachment lugs 23 for the pins 7 by which the clutch bands are fixedly connected to said drum. Fig. 1 shows the clutch band 5 connected at its upper end by a pin 7 to the drum 3 and the clutch band 6 connected at its lower end by a pin 7 to said drum. To adapt the clutch for a driving shaft having clockwise rotation, the positions of the bands 5 and 6 will be reversed; that is to say, the band 5, which, as shown, has a position at the left of Fig. 1, will be positioned at the opposite side of the clutch and its fastening pin 7 will be engaged in the upper lugs 23 at the right of those in which said fastening pin is shown as engaged and the band 6, which, as shown, has a position at the right of Fig. 1, will be positioned at the opposite side of the clutch and its fastening pin 7 will be engaged in the lower lugs 23 at the left of those in which said fastening pin is shown as engaged. The yoke 11 will also be shifted to engage with the pins 13 those lugs 15 which are distant from said pins in the arrangement disclosed and which are located, respectively at the right of the upper pin and at the left of the lower pin. In connection with such adjustment of the yoke 11, the projections 21 will be removed from the positions in which they are now shown to positions at the opposite sides of the crown pieces 20, the duplication of the openings 22 permitting such adjustment of the positions of the projections 21. In consideration of the change of the positions of the projections 21 in the case assumed, the pins 13, when constructed as in the embodiment disclosed, must each be turned through a half revolution to properly present their cam faces to the projections 21.

The pins 7 are preferably securely held in the lugs 23 by fastening screws.

By virtue of the provision of the two bands 5 and 6 instead of the single approximately annular band ordinarily employed, and of the provision of the yoke 11 for putting tension on said bands at diametrically opposite points, side pull between the drums 3 and 4 is eliminated and the frictional pressure is so applied that there is no liability of its interfering with the alinement of the drums and the shafts.

Having fully described our invention, we claim:—

1. In a friction clutch, in combination, driving and driven elements, one of which has a flat wall, a pair of levers pivoted at diametrically opposite points on said flat wall, a yoke arranged against said flat wall and between the same and said levers and mounted for oscillatory movement in the plane of the clutch about an axis coincident with the axis of rotation of said driving and driven elements, said yoke being operatively associated with said levers, and a pair of clutch bands having ends operatively connected to said levers and having their other ends connected at diametrically opposite points to the element to which said levers are pivoted, the other element being formed as a drum for engagement by said clutch bands.

2. In a friction clutch, in combination, driving and driven elements, one of which has a flat wall, a pair of levers pivoted at diametrically opposite points on said flat wall, a yoke arranged against said flat wall and between the same and said levers and mounted for oscillatory movement in the plane of the clutch about an axis coincident with the axis of rotation of said driving and driven elements, said yoke having oppositely located recesses and said levers having pins for operative engagement in said recesses, and a pair of clutch bands having ends operatively connected to said levers and having their other ends connected at diametrically opposite points to the element to which said levers are pivoted, the other element being formed as a drum for engagement by said clutch bands.

3. In a friction clutch, in combination, driving and driven elements, a pair of clutch bands for circumferential engagement with one of said elements, fixed connections between certain ends of said bands and one of said elements, said connections being located in diametrically opposite relation, an element operatively connected to the other ends of said bands and operable to engage or disengage the latter, said last-named element being mounted for oscillatory movement in the plane of the clutch about an axis coincident with the axis of rotation of said driving and driven elements, a collar mounted for sliding movement in the direction of the axis of rotation of said driving and driven elements, and means for transmitting a movement of said collar in one direction to said oscillatory element for producing an oscillatory movement of the latter.

4. In a friction clutch, in combination, driving and driven elements, a pair of clutch bands for circumferential engagement with one of said elements, fixed connections between certain ends of said bands and one of said elements, said connections being located in diametrically opposite relation, an element operatively connected to the other ends of said bands and operable to engage or disengage the latter, said last named element being mounted for oscillatory movement in the plane of the clutch about an axis coincident with the axis of rotation of said driving and driven elements, a collar mounted for sliding movement in the direction of the axis of rotation of said driving and driven elements, and means for transmitting a movement of said collar in one direction to said oscillatory element for producing an oscillatory movement of the latter, the means comprising a pair of projections located at diametrically opposite points on said oscillatory element and a pair of pins located at diametrically opposite points on said collar and having cam ends for engagement with said projections.

5. In a friction clutch, in combination, driving and driven elements, one of which has a flat wall, a pair of levers pivoted at diametrically opposite points to said flat wall and movable in the plane of the clutch, an element mounted for oscillatory movement in the plane of the clutch upon an axis coincident with the axis of rotation of said driving and driven elements and having oppositely located recesses, the levers having pins engaging in said recesses and the recesses being substantially wider than said pins to permit of an adjustment of said oscillatory element relatively to said levers, a collar mounted for sliding movement in the direction of the axis of rotation of said driving and driven elements, pins carried by said collar for operating said oscillatory element, projections carried by said oscillatory element for engagement by said pins, said oscillatory element having crown pieces carrying said projections and of sufficient width to permit said projections to be mounted at either side of said pins in accordance with the relation of said element to said levers, and clutch bands having ends connected to said levers and having their other ends connected at opposite points to the element to which said levers are pivoted, the other element being formed as a drum for engagement by said clutch bands.

In testimony whereof we have hereunto set our hands in presence of two subscribing witnesses.

CHARLES G. OBERLEY.
ROBERT GRIGNON.

Witnesses:
RIPLEY B. BROWER,
MARIE THILL.

Copies of this patent may be obtained for five cents each, by addressing the "Commissioner of Patents, Washington, D. C."